3,146,217
THERMOPLASTIC COMPOSITIONS STABILIZED
WITH ALKYL o-SALICYLOYLBENZOATES
David A. Gordon, 3405 Washington, and John M.
Corbett, 308 Longview, both of Midland, Mich.
No Drawing. Filed Feb. 24, 1960, Ser. No. 10,548
7 Claims. (Cl. 260—45.85)

This invention relates to new and improved thermoplastic compositions having improved stability to the degradative effects of light, particularly ultraviolet light.

Thermoplastic compositions, particularly those prepared from haloethylene polymers, have found wide acceptance as useful materials for making foils, fibers, filaments and other articles. The articles so produced are inherently strong, dimensionally stable, relatively inert to common household solvents and are easily colored for an attractive appearance. However, such articles are subject to rapid and severe degradation and consequent discoloration due to the effects of heat and light. The problem becomes most serious when polymeric compositions are employed as filamentary materials in making window curtains, automobile seat covers, and other articles which are exposed for prolonged periods of time to direct sunlight. To overcome this disadvantage it has become most practical to incorporate certain additives into the composition to stabilize it to the effects of heat and to add other materials to the composition to stabilize it to the effects of light. Some of the prior light stabilizing materials have suffered from the disadvantages of bleeding out of articles made from polymeric vinyl or vinylidene halides. In addition, some of the materials are colored so that they impart an objectionable initial color to the composition which prevents the production of white articles. Further, many of the prior materials lose their effectiveness as light stabilizers after exposure to sunlight for a short time.

It is accordingly an object of this invention to provide improved polymeric compositions having increased resistance to the degradative effects of ultraviolet light.

Another object of the invention is to provide such stabilized polymers which have little or no color, enabling the production of clear or white articles therefrom.

It is a further particular object of the invention to provide such a composition which is based on a chloroethylene polymer and is resistant to the effects of light over prolonged periods of exposure to direct sunlight.

The above and related objects of the invention are achieved with a polymeric composition and stabilizing quantities of an ester of o-salicyloylbenzoic acid having the general formula:

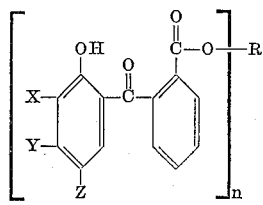

wherein X and Y are independently selected from the group consisting of hydrogen, halogen, alkoxy, aryl of the benzene series, and alkyl having from 1 to 12 carbon atoms, Z is selected from the group consisting of halogen, alkoxy and alkyl having from 1 to 12 carbon atoms, R is selected from the group consisting of alkyl containing 1 to 12 carbon atoms, aliphatic glycol residues containing 1 to 12 carbon atoms, allyl, and aryl of the benzene series, and $n$ is an integer selected from the group of 1 and 2.

Among the specific compounds defined by the foregoing formula and which have light stabilizing action in thermoplastic compositions are:

Methyl o-(5-chlorosalicyloyl)benzoate
Ethyl o-(5-chlorosalicyloyl)benzoate
Isobutyl o(5-chlorosalicyloyl)benzoate
n-Butyl o-(5-chlorosalicyloyl)benzoate
Allyl o-(5-chlorosalicyloyl)benzoate
4-methyl-2-propylpentyl o-(5-chlorosalicyloyl)benzoate
Ethylene glycol bis (o-(5-chlorosalicyloyl)benzoate)
Phenyl o-(5-chlorosalicyloyl)benzoate
Phenyl o-(5-methoxysalicyloyl)benzoate
Methyl o-(5-methylsalicyloyl)benzoate[methyl
  o-(2,5-cresotoyl)benzoate]
Ethyl o-(5-methylsalicyloyl)benzoate
Phenyl o-(5-methylsalicyloyl)benzoate
Methyl o-(5-chloro-4-methylsalicyloyl)benzoate
Methyl o-(5-chloro-4-t-butylsalicyloyl)benzoate
Ethyl o-(3,5-dimethylsalicyloyl)benzoate
Methyl o-(4,5-dimethylsalicyloyl)benzoate
Lauryl o-(3,4-diethoxy-5-chlorosalicyloyl)benzoate
Hexylene glycol bis (o-(3,5-dimethylsalicyloyl)benzoate Although a wide variety of thermoplastic materials may be stabilized in accordance with this invention, particularly advantageous results are obtained with haloethylene polymers, such as the polymers of vinyl chloride or vinylidene chloride, the copolymers of vinyl chloride and vinylidene chloride, copolymers of vinyl chloride with other monomers copolymerizable therewith, such as vinyl acetate, acrylonitrile or alkyl acrylates, and the copolymers of vinylidene chloride with copolymerizable monomers, such as vinyl acetate, acrylonitrile or alkyl acrylates, wherein the vinylidene chloride is present in an amount of at least 70 percent by weight. Those haloethylene polymers are accordingly preferred in preparing the compositions. Haloethylene polymers present a difficult and unusual problem in that once degradation or discoloration has started the effect appears to be autocatalytic or at least accelerated. However, the stabilizers of this invention also are operable in the indicated capacity with the polyesters, such as polyethylene terephthalate; polyamides, such as polyhexamethylene adipamide; polystyrene; polyolefins, such as polyethylene, polypropylene, or copolymers of ethylene and propylene; and cellulose esters, such as cellulose acetate; and cellulose ethers, such as ethyl cellulose.

The stabilizing agents of this invention may be easily prepared from readily available materials by a number of known methods. As representative of the preparation of the compounds a method for the preparation of ethyl o-(3,5-dimethylsalicyloyl)benzoate will be described. In this method a 1,1,2,2 tetrachloroethane solution of phthalic anhydride and 2,4-dimethyl phenol is subjected to a temperature of 50 to 75° C. while an excess of aluminum chloride is slowly added over a period of about 55 to 140 minutes. The reaction mixture is poured into dilute HCl-ice water, the solvent removed by steam distillation, the product extracted with aqueous sodium bicarbonate, filtered, and the free acid, o - (3,5 - dimethylsalicyloyl)benzoic acid, is precipitated with HCl. The acid may be purified by crystallization from benzene. The ester is prepared by refluxing the acid and ethyl alcohol with an esterification catalyst, such as sulfuric acid. Other esters within the scope of the above general formula may be similarly prepared by choosing the desired substituted phenol and esterifying alcohol and conducting the reactions generally as described above.

The o-salicyloyl benzoic acid esters of this invention may be employed in amounts of from 0.2 to 10 percent, preferably 0.5 to 3 percent, by weight based on the weight of the polymer employed. Most polymeric compositions comprise many ingredients such as plasticizers, fillers, pigments and heat stabilizers, and the derivatives of this invention may be employed in the compositions in conjunction with such additives without any adverse effects. Likewise the derivatives may be used in conjunction with other known light stabilizers. The ingredients may be intermixed by milling or blending by known conventional methods.

The compositions of this invention show superior resistance to degradation due to light over prior compositions. This superiority will be more apparent from the following illustrative examples in which all parts are by weight.

*Example 1*

A series of samples were made consisting of 91.75 parts of a copolymer prepared from a monomeric mixture consisting of 85 percent vinylidene chloride and 15 percent vinyl chloride, 4 parts of dinonyl adipate plasticizer, 2 parts diethyl phthalate plasticizer and 0.25 part of tetrasodium pyrophosphate as a heat stabilizer. To some of the samples of this basic formulation were added 2 parts of a stabilizer of this invention. To other samples were added 2 parts of 5-chloro-2-hydroxy benzophenone, o-(5-chlorosalicyloyl) benzoic acid, both known stabilizers, and the free acid o-(5-methylsalicyloyl) benzoic acid, for comparative purposes. The compositions were extruded into fine fibers. Some of the fiber samples were scoured by boiling one-half hour in 1 percent aqueous Dupanol RA (an alcohol ether sodium sulfate) and others were doubly scoured by boiling one-half hour in 1 percent aqueous Dupanol RA solution followed by water rinsing and finally boiling one-half hour in 1 percent aqueous solution of Orvus ES paste (a sodium alkyl sulfate). The fibers were then exposed to ultraviolet light and the useful life in hours of Fadeometer exposure (the number of ultraviolet hours required to reach a standard browning) was determined. The results are listed in the following table:

| Stabilizer | Fadeometer useful life (hours) | | |
|---|---|---|---|
| | Unscoured | Scoured | Doubly scoured |
| Ethyl o-(5-chlorosalicyloyl)benzoate | 960 | 300 | 251 |
| Isobutyl o-(5-chlorosalicyloyl) benzoate | 400 | 320 | |
| 4-methyl-2-propylpentyl o-(5-chlorosalicyloyl) benzoate | 380 | 360 | |
| Ethyl o-(5-methylsalicyloyl) benzoate | 860 | | 280 |
| For Comparison: | | | |
| o-(5-methylsalicyloyl) benzoic acid | 420 | | 70 |
| o-(5-chlorosalicyloyl) benzoic acid | 420 | | 70 |
| 5-chloro-2-hydroxybenzophenone | 280 | 240 | 163 |

It can be seen that the derivatives of this invention provide appreciably greater protection to the polymer composition against the degradative effects of light than do known light stabilizers.

*Example 2*

A composition was prepared by blending a linear low pressure polyethylene having a melt index of 0.45 with 1 percent isobutyl-o-(5-chlorosalicyloyl)benzoate. Another sample was left unstabilized for use as a blank. The samples were compression molded into test specimens having a thickness of 0.025 inch. The specimens were exposed to GE S-1 sunlamps for four days. Following exposure the specimens were tested for toughness or brittleness. In this test it was attempted to bend the sample over upon itself and also to bend the sample over a small mandrel. The specimens were examined visually and rated according to a scale wherein the best rating was No. 1 and indicated that the specimen could be bent over itself without fracture, whiteness, crazing or other overt indication of embrittlement. The lowest rating was No. 11 indicating complete embrittlement as evidenced by fracturing with shattering upon testing. When the specimens of this example were subjected to this test, the unstabilized blank had a rating of 11. The specimen stabilized according to this invention had a rating of 1.

Similar results were observed when the above stabilizer was employed in 1 percent concentration with polypropylene, copolymers of ethylene and propylene, copolymers of styrene and methyl methacrylate, copolymers of styrene and acrylonitrile, and polystyrene.

From these results it is observed that the stabilizers of this invention protect organic thermoplastic materials from discoloration and embrittlement caused by exposure to the degradative effects of ultraviolet light.

We claim:

1. A light stable composition of matter comprising an organic thermoplastic polymer normally subject to discoloration on exposure to light and from 0.2 to 10 percent of the weight of said polymer of an ester of o-salicyloylbenzoic acid having the general formula:

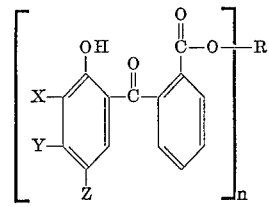

wherein X and Y are independently selected from the group consisting of hydrogen, alkoxy, and alkyl having from 1 to 12 carbon atoms, Z is selected from the group consisting of halogen, alkoxy, and alkyl having from 1 to 12 carbon atoms, R is selected from the group consisting of alkyl containing 1 to 12 carbon atoms, aliphatic glycol residues containing 1 to 12 carbon atoms, allyl and aryl of the benzene series, and $n$ is an integer selected from the group of 1 and 2.

2. The composition claimed in claim 1 containing from 0.5 to 3 percent of the weight of polymer of said ester.

3. The composition claimed in claim 1 wherein said organic thermoplastic polymer consists of a polymer of vinylidene chloride.

4. The composition claimed in claim 1 wherein said polymer is a copolymer composed of at least 70 percent by weight of vinylidene chloride.

5. The composition claimed in claim 1 wherein said polymer is a copolymer of vinylidene chloride and vinyl chloride.

6. The composition claimed in claim 1 wherein said ester is ethyl o-(5-chlorosalicyloyl)benzoate.

7. The composition claimed in claim 1 wherein said ester is ethyl o-(5-methylsalicyloyl)benzoate.

References Cited in the file of this patent

UNITED STATES PATENTS

| 2,432,517 | Drefus | Dec. 16, 1947 |
| 2,464,250 | Moll et al. | Mar. 15, 1949 |
| 2,755,259 | Dilke et al. | July 17, 1956 |
| 2,853,466 | Havens | Sept. 23, 1958 |
| 2,861,976 | Gordon | Nov. 25, 1958 |
| 2,900,361 | Havens | Aug. 18, 1959 |
| 2,943,076 | Havens et al. | June 28, 1960 |